(12) United States Patent
Kato et al.

(10) Patent No.: US 9,343,768 B2
(45) Date of Patent: May 17, 2016

(54) METHOD FOR ACTIVATING FUEL CELL

(71) Applicant: HONDA MOTOR CO., LTD., Tokyo (JP)

(72) Inventors: Takashi Kato, Utsunomiya (JP); Hodaka Tsuge, Utsunomiya (JP); Tadaaki Yamada, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 13/726,832

(22) Filed: Dec. 26, 2012

(65) Prior Publication Data

US 2013/0171529 A1 Jul. 4, 2013

(30) Foreign Application Priority Data

Dec. 28, 2011 (JP) ................................. 2011-287426

(51) Int. Cl.
*H01M 8/10* (2016.01)
*H01M 8/04* (2016.01)

(52) U.S. Cl.
CPC ............ *H01M 8/10* (2013.01); *H01M 8/04223* (2013.01); *H01M 8/04574* (2013.01); *H01M 8/04873* (2013.01); *H01M 2008/1095* (2013.01); *Y02E 60/50* (2013.01)

(58) Field of Classification Search
CPC .............. H01M 8/10; H01M 8/04574; H01M 8/04873; H01M 2008/1095; H01M 8/04223; Y02E 60/50
USPC ........................... 429/479, 523, 529, 535, 409
See application file for complete search history.

(56) References Cited

U.S. PATENT DOCUMENTS

| 2003/0096156 A1 | 5/2003 | Asaoka et al. |
| 2009/0155635 A1 | 6/2009 | Cho et al. |
| 2011/0008686 A1 * | 1/2011 | Gould et al. .................. 429/400 |

FOREIGN PATENT DOCUMENTS

| JP | 2003-157857 | 5/2003 | |
| JP | 2005-243245 | 9/2005 | |
| JP | 2007-115637 | * 10/2007 | ............ Y02E 60/521 |
| JP | 2008-204799 | 9/2008 | |

(Continued)

OTHER PUBLICATIONS

Alexander Ponrouch, Sebastien Garbarino, Daniel Guay, Effect of the nanostructure on the CO poisoning rate of platinum in "Electrochemistry Communication, vol. 11, 2009, pp. 834-837".*

(Continued)

*Primary Examiner* — Jonathan Jelsma
*Assistant Examiner* — Omar Kekia
(74) *Attorney, Agent, or Firm* — Rankin, Hill & Clark LLP

(57) ABSTRACT

In a solid polymer electrolyte fuel cell, a potential is swept to obtain a cyclic voltammogram. The activation treatment is completed when any of conditions (a) to (c) is satisfied. (a): the peak number between 0.1 and 0.3 V increases from one to two, and inequalities of $I1/I3 \geq 1.2$ and $I2/I3 \geq 1.2$ are satisfied where $I1$, $I2$ and $I3$ are current values of the two peaks, and the minimum current value between the two peaks, respectively; (b): an oxidation peak within a range of 0.4 to 0.7 V decreases, and a charge amount corresponding to the peak decreases to 20 mC or less; and (c): the ratio $I5/I4$ increases from less than 1 to 1 where $I4$ and $I5$ are current values of a reduction peak within a range of 0.6 to 0.7 V and a reduction peak within a range of 0.7 to 0.8 V, respectively.

2 Claims, 14 Drawing Sheets

(56) References Cited

FOREIGN PATENT DOCUMENTS

| | | |
|---|---|---|
| JP | 2009-146876 | 7/2009 |
| JP | 2009146876 | 7/2009 |
| JP | 2010-092799 | 4/2010 |
| JP | 2010146793 | 7/2010 |

OTHER PUBLICATIONS

Machine English language translation of JP 2007-115637 (A)—May 10, 2007 to Tsuji Yoichiro et al. in PDF format file attached.*

Office Action in corresponding Japanese Patent Application 2011-287426, dated Apr. 22, 2014, partial English translation included.

* cited by examiner

METHOD FOR ACTIVATING FUEL CELL

CROSS-REFERENCE TO RELATED APPLICATION

This application is based upon and claims the benefit of priority from Japanese Patent Application No. 2011-287426 filed on Dec. 28, 2011, the contents of which are incorporated herein by reference.

BACKGROUND OF THE INVENTION

1. Field of the Invention

The present invention relates to a method for activating a fuel cell having an electrolyte membrane containing a solid polymer, and more specifically to a method for activating a fuel cell, the method being capable of judging an activation completion timing.

2. Description of the Related Art

As is well known, a fuel cell having an electrolyte membrane containing a solid polymer is referred to as a solid polymer electrolyte fuel cell. The fuel cell contains a membrane-electrode assembly, which is formed by sandwiching the electrolyte membrane between an anode and a cathode.

This type of the fuel cell is subjected to a treatment for achieving a sufficient power generation performance. For example, before the fuel cell is practically operated, the fuel cell is subjected to a preliminary operation for supplying a sufficient amount of moisture to the electrolyte membrane (i.e. aging). For example, in Japanese Laid-Open Patent Publication No. 2005-243245, the applicant has proposed an aging method containing the steps of gradually increasing the output current of the fuel cell to a predetermined upper limit value and thereafter keeping the output current at the upper limit value.

Furthermore, Japanese Laid-Open Patent Publication No. 2008-204799 proposes an activation method, wherein a highly crystalline carbon black having an Lc value of 5 or more is used as a carrier for a catalyst included in electrode catalyst layers of the anode and the cathode, and a voltage periodically varying within a range of 1.0 to 1.5 V is repeatedly applied between the anode and the cathode.

SUMMARY OF THE INVENTION

As described in Japanese Laid-Open Patent Publication Nos. 2005-243245 and 2008-204799, time control is generally performed in the aging or activation treatment of the fuel cell. That is, when a predetermined time has elapsed, the next step is carried out, or the aging or activation treatment is completed.

In this case, even when a plurality of the fuel cells are subjected to the aging or activation treatment under the same conditions, all the fuel cells do not necessarily exhibit the same power generation performance. This is because there are individual differences between components of the fuel cells. For example, in the case of treating a fuel cell having an excessively dried electrolyte membrane and a fuel cell having a moderately moist electrolyte membrane, even when the electrolyte membranes are equally moisturized by the aging, the latter electrolyte membrane exhibits a higher proton conductivity, and thus the latter fuel cell exhibits a more excellent power generation performance.

As is clear from this, in the aging or activation treatment utilizing the time control, the power generation performance may vary among a plurality of the treated fuel cells disadvantageously.

A general object of the present invention is to provide a method for activating a fuel cell, which is capable of sufficiently activating individual fuel cells.

A principal object of the present invention is to provide a method for activating a fuel cell, which is capable of preventing power generation performance from varying among a plurality of fuel cells.

According to an aspect of the present invention, there is provided a method for activating a fuel cell having an electrolyte membrane containing a solid polymer, the method comprising the step of sweeping the potential of the fuel cell to obtain a cyclic voltammogram, wherein the potential sweeping is continued until:

the number of oxidation peaks within a range of 0.1 to 0.3 V increases from one to two, and the two oxidation peaks satisfy the inequalities of $I1/I3 \geq 1.2$ and $I2/I3 \geq 1.2$ where $I1$ and $I2$ are current values of the two oxidation peaks, respectively, and $I3$ is the minimum current value between the two oxidation peaks (this condition will be hereinafter also referred to as "a first condition");

thereafter, an oxidation peak within a range of 0.4 to 0.7 V decreases, and accordingly a charge amount corresponding to the oxidation peak decreases to 20 mC or less (this condition will be hereinafter also referred to as "a second condition"); and thereafter, the ratio of $I5/I4$ increases from less than 1 to 1 where $I4$ is a current value of a reduction peak within a range of 0.6 to 0.7 V, and $I5$ is a current value of a reduction peak within a range of 0.7 to 0.8 V (this condition will be hereinafter also referred to as "a third condition").

As described above, the time control is performed in the aging or activation treatment in the related art. Thus, when a predetermined time has elapsed, the aging or activation of the fuel cell is judged to be completed.

In contrast, in this aspect of the present invention, the activation is judged to be completed when the above-described first to third conditions are satisfied.

Therefore, a plurality of the fuel cells can be sufficiently activated approximately equally regardless of individual differences among the fuel cells.

Consequently, a plurality of the fuel cells can be prevented from varying in the activation degree, so that the fuel cells can exhibit approximately the same power generation performances. Thus, in the present invention, the power generation performance variations can be prevented.

Furthermore, each of the fuel cells can be sufficiently activated, and can exhibit an excellent power generation performance after the activation treatment.

It is considered that when the first condition is satisfied, a relatively high-active surface of a catalyst (such as Pt or Au) is exposed. Also, it is considered that when the second condition is satisfied, carbon functional groups are eliminated from the catalyst to increase the exposed active surface area of the catalyst. Further, it is considered that when the third condition is satisfied, oxygen adsorbed to a surface of the catalyst is eliminated and reduced.

The activation may be judged to be completed when the first and second conditions are satisfied.

That is, according to another aspect of the present invention, there is provided a method for activating a fuel cell having an electrolyte membrane containing a solid polymer, the method comprising the step of sweeping the potential of the fuel cell to obtain a cyclic voltammogram, wherein the potential sweeping is continued until:

the number of oxidation peaks within a range of 0.1 to 0.3 V increases from one to two, and the two oxidation peaks satisfy the inequalities of I1/I3≥1.2 and I2/I3≥1.2 where I1 and I2 are current values of the two oxidation peaks, respectively, and I3 is the minimum current value between the two oxidation peaks; and thereafter, an oxidation peak within a range of 0.4 to 0.7 V decreases, and accordingly a charge amount corresponding to the oxidation peak decreases to 20 mC or less.

The activation may be judged to be completed when any one of the first, second, and third condition is satisfied.

According to a further aspect of the present invention, there is provided a method for activating a fuel cell having an electrolyte membrane containing a solid polymer, the method comprising the step of sweeping the potential of the fuel cell to obtain a cyclic voltammogram, wherein the potential sweeping is continued until:

the number of oxidation peaks within a range of 0.1 to 0.3 V increases from one to two, and the two oxidation peaks satisfy the inequalities of I1/I3≥1.2 and I2/I3≥1.2 where I1 and I2 are current values of the two oxidation peaks, respectively, and I3 is the minimum current value between the two oxidation peaks.

According to a still further aspect of the present invention, there is provided a method for activating a fuel cell having an electrolyte membrane containing a solid polymer, the method comprising the step of sweeping the potential of the fuel cell to obtain a cyclic voltammogram, wherein the potential sweeping is continued until:

an oxidation peak within a range of 0.4 to 0.7 V decreases, and accordingly a charge amount corresponding to the oxidation peak decreases to 20 mC or less.

According to a still further aspect of the present invention, there is provided a method for activating a fuel cell having an electrolyte membrane containing a solid polymer, the method comprising the step of sweeping the potential of the fuel cell to obtain a cyclic voltammogram, wherein the potential sweeping is continued until:

the ratio of I5/I4 increases from less than 1 to 1 where I4 is a current value of a reduction peak within a range of 0.6 to 0.7 V, and I5 is a current value of a reduction peak within a range of 0.7 to 0.8 V.

In any one of the aspects, a plurality of the activated fuel cells can have the same activation degrees. Therefore, as described above, plural fuel cells can have substantially the same power generation performances, and each of the fuel cell can exhibit an excellent power generation performance.

In the first condition, a peak within a range of 0.15 to 0.2 V (first oxidation peak) and a peak within a range of 0.25 to 0.3 V (second oxidation peak) may be selected as the two oxidation peaks.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A method for activating a fuel cell according to a preferred embodiment of the present invention will be described in detail below with reference to the accompanying drawings.

First, an activation apparatus 10 will be described below with reference to FIG. 1. The activation apparatus 10 has a potentiostat 14 electrically connected to a solid polymer electrolyte fuel cell (hereinafter referred to also simply as a fuel cell) 12, and further has a potential sweeper 16 for controlling the potentiostat 14.

Figure 1:
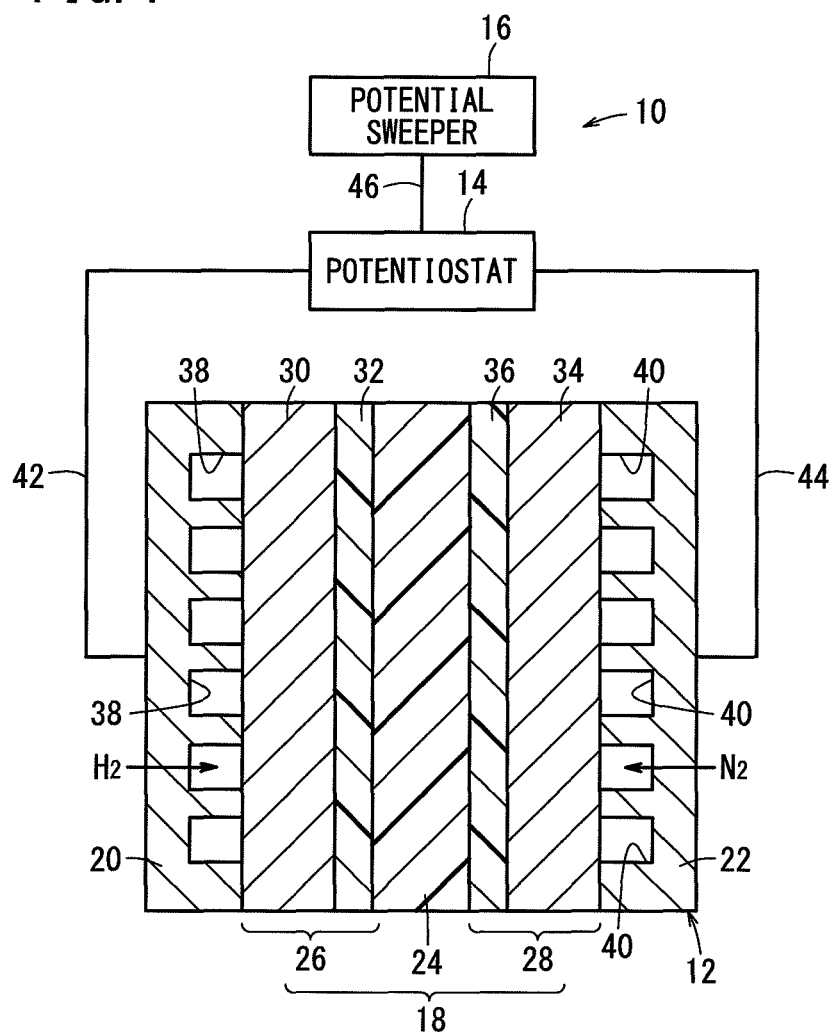
FIG. 1 is a schematic longitudinal cross-sectional view of a principal part of an activation apparatus for performing a method for activating a fuel cell according to an embodiment of the present invention, the apparatus being attached to a solid polymer electrolyte fuel cell.
Figure 2:
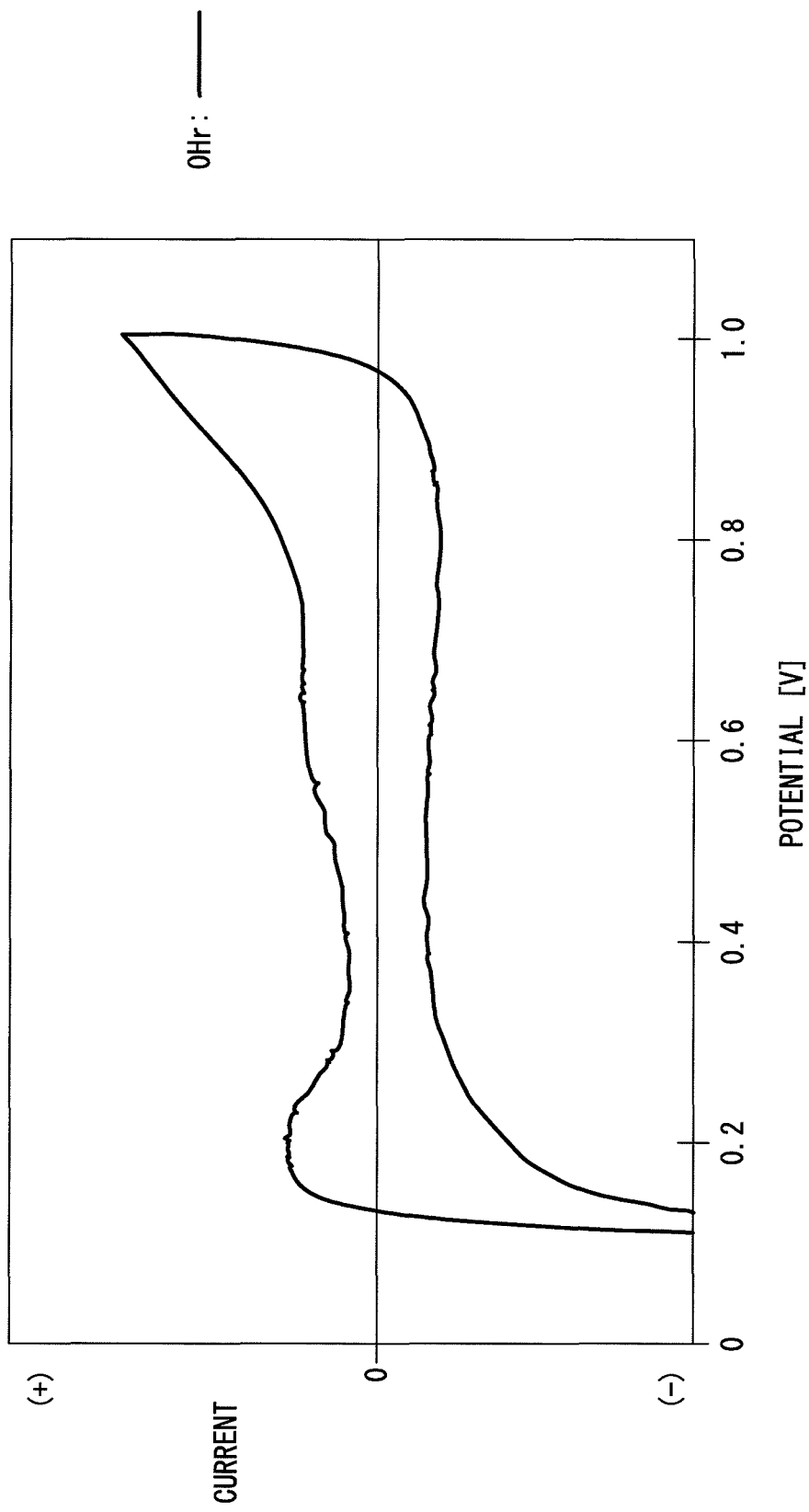
FIG. 2 is a cyclic voltammogram obtained in a first cycle (when 0 hours have elapsed) after start of potential sweeping.
Figure 3:
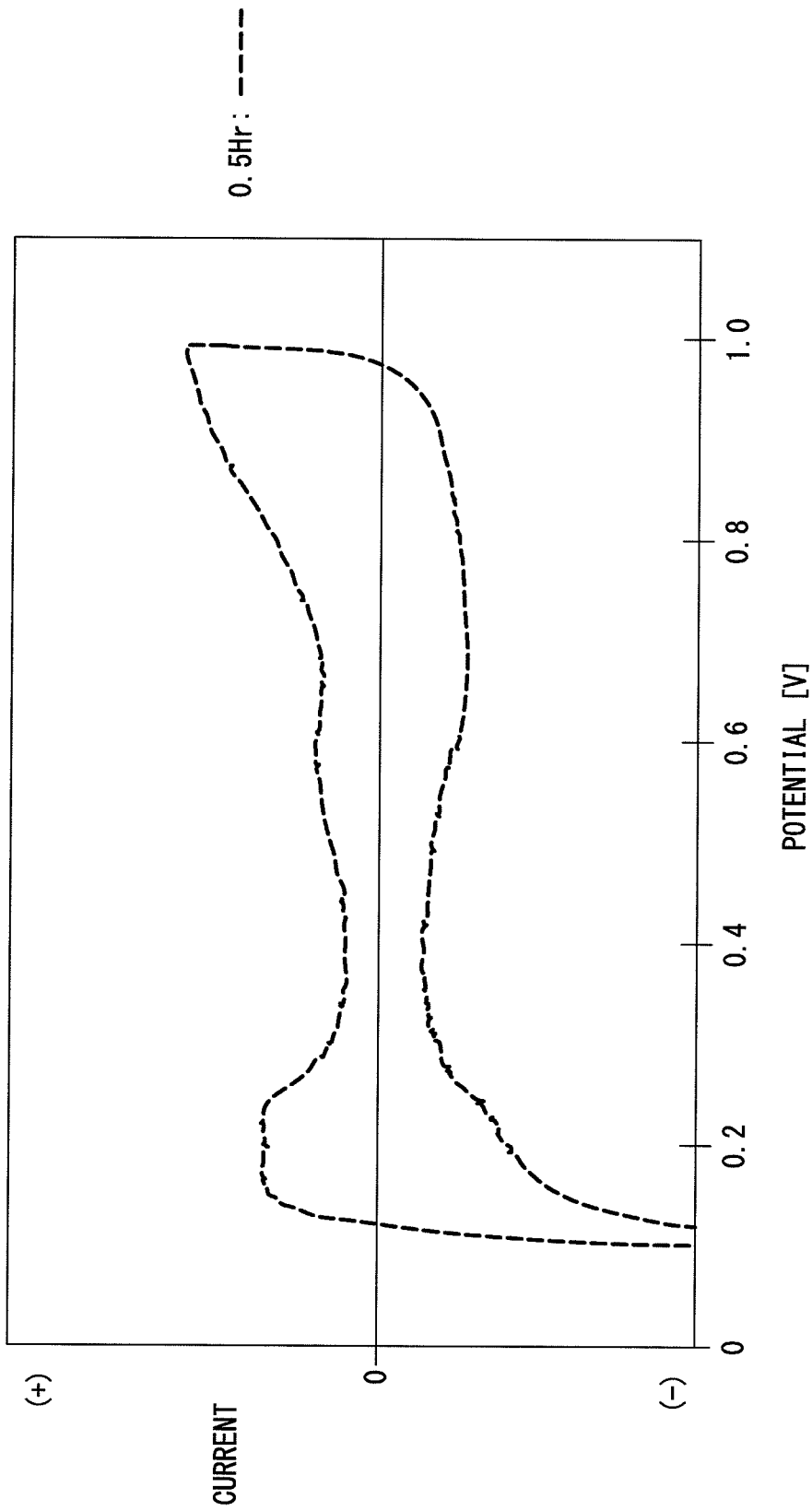
FIG. 3 is a cyclic voltammogram obtained when 0.5 hours (30 minutes) have elapsed after the start of potential sweeping.
Figure 4:
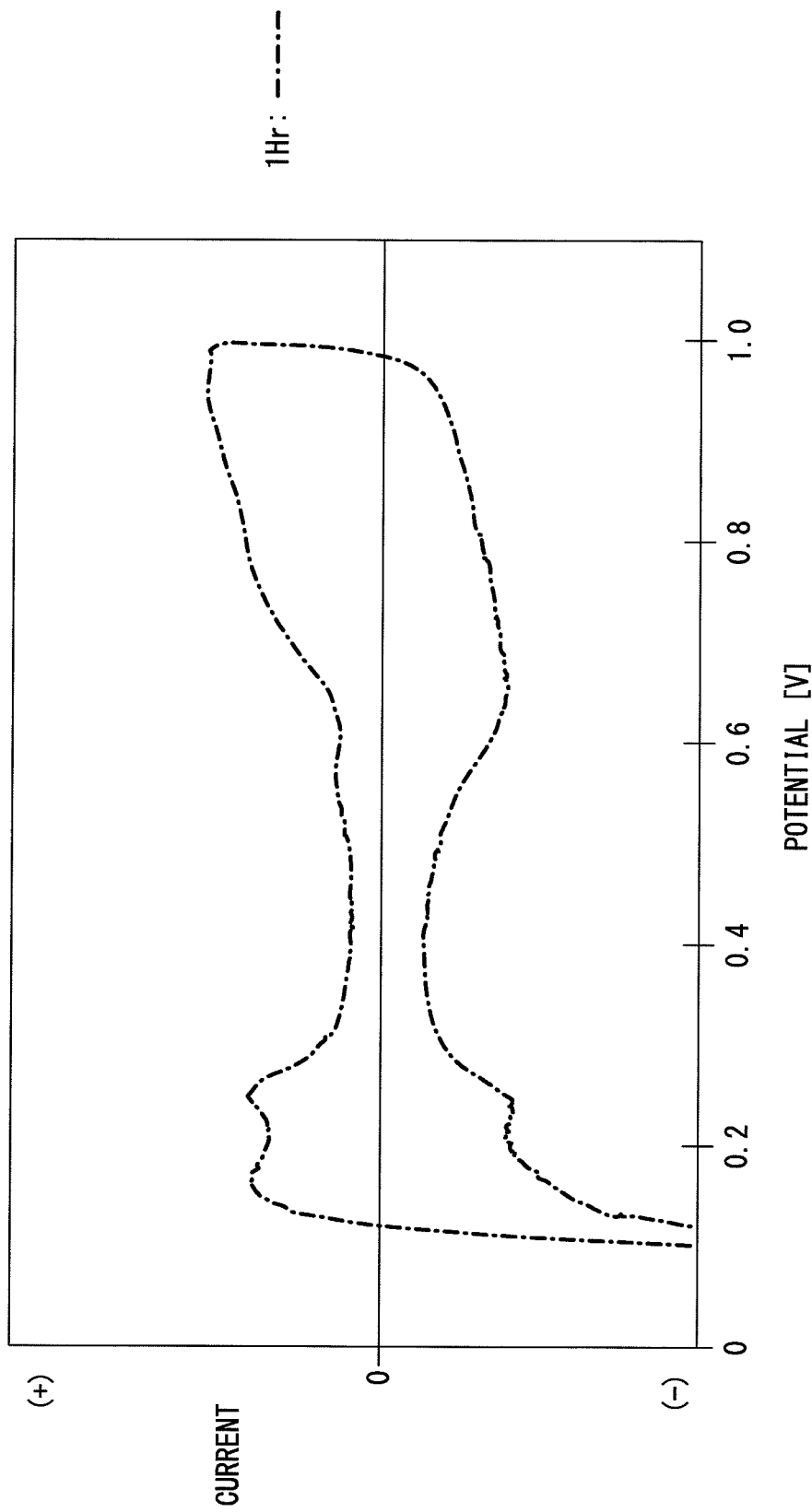
FIG. 4 is a cyclic voltammogram obtained when 1 hour (60 minutes) has elapsed after the start of potential sweeping.
Figure 5:
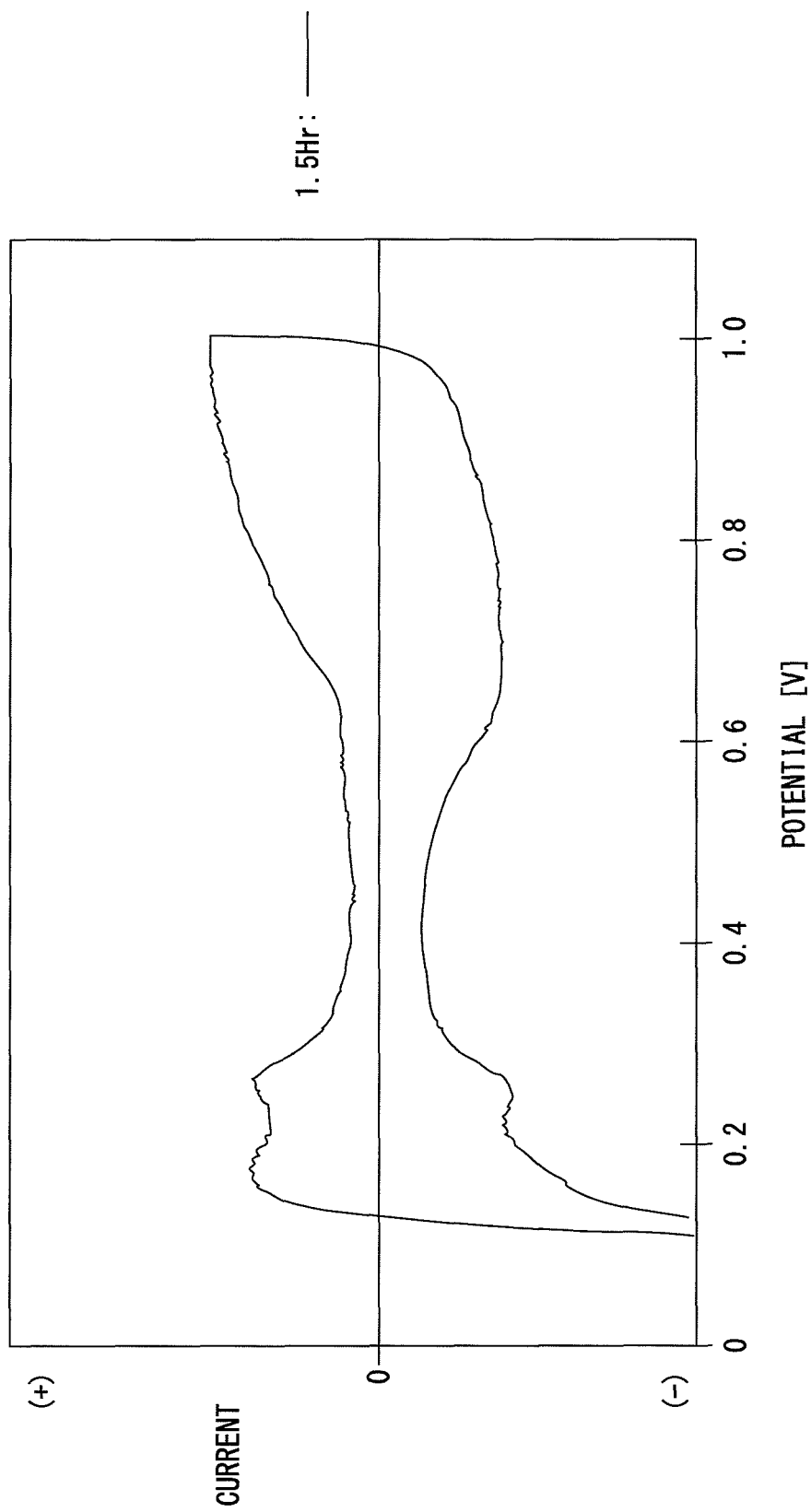
FIG. 5 is a cyclic voltammogram obtained when 1.5 hours (90 minutes) have elapsed after the start of potential sweeping.
Figure 6:
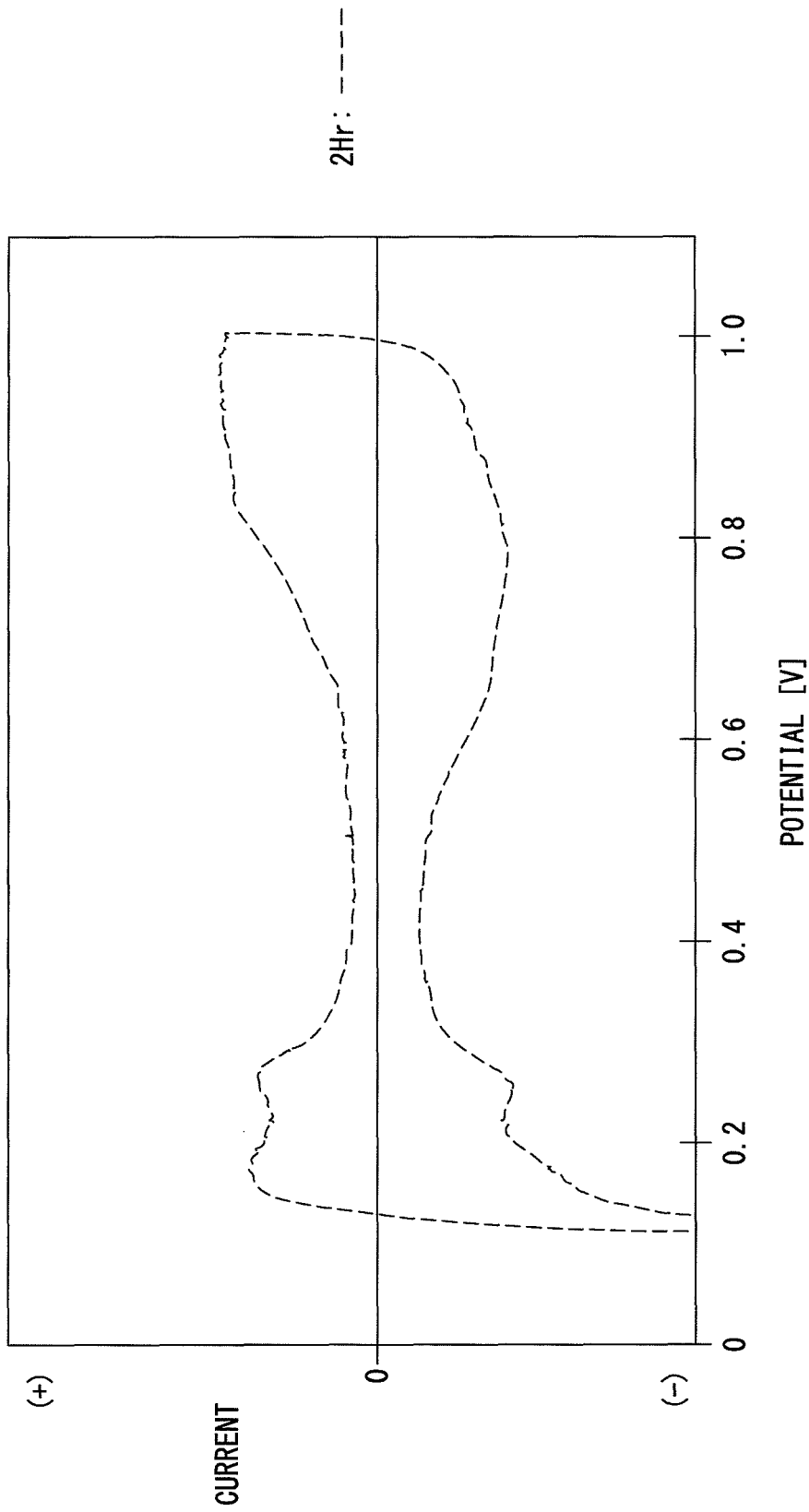
FIG. 6 is a cyclic voltammogram obtained when 2 hours (120 minutes) have elapsed after the start of potential sweeping.

FIG. 1 shows the fuel cell 12 as a unit cell. Specifically, the unit cell has a membrane-electrode assembly 18, and first and second separators 20 and 22 sandwiching the membrane-electrode assembly 18 therebetween.

The membrane-electrode assembly 18 includes an electrolyte membrane 24, and an anode 26 and a cathode 28 sandwiching the electrolyte membrane 24 therebetween. The electrolyte membrane 24 is a solid polymer membrane made of a proton-conductive polymer. Examples of such polymers include perfluorosulfonic acid-based fluororesins.

The anode 26 is disposed on one surface of the electrolyte membrane 24. The anode 26 has a gas diffusion layer 30, to which a fuel gas such as hydrogen is supplied, and an electrode catalyst layer 32 facing the electrolyte membrane 24.

The cathode 28 is disposed on the other surface of the electrolyte membrane 24. Similarly to the anode 26, the cathode 28 has a gas diffusion layer 34, to which an oxygen-containing gas such as air or oxygen is supplied, and an electrode catalyst layer 36 facing the electrolyte membrane 24.

The above structures of the anode 26 and the cathode 28 are known, and therefore detailed explanations of the gas diffusion layers 30 and 34 and the electrode catalyst layers 32 and 36 are omitted. In this embodiment, the electrode catalyst layers 32 and 36 contain platinum (Pt) as a catalyst. The platinum may be used singly, and may be supported on a carrier such as a carbon black.

For example, the first and second separators 20 and 22 may be composed of a metal sheet such as a steel sheet, a stainless steel sheet, an aluminum sheet, or a plated steel sheet. The metal sheet may be subjected to an anticorrosion surface treatment. Alternatively, the first and second separators 20 and 22 may be composed of a carbon sheet in some cases.

The first and second separators 20 and 22 have surfaces facing the gas diffusion layers 30 and 34, and a fuel gas flow field 38 and an oxygen-containing gas flow field 40 are formed on the surfaces, respectively.

The fuel cell 12 generally contains a stack of a plurality of the above-described unit cells stacked. In FIG. 1, the fuel cell 12 is shown as the unit cell to facilitate the understanding. It should be noted that both of the unit cell and the stack can be activated by the activation method to be hereinafter described.

In the activation apparatus 10, the potentiostat 14 is electrically connected to the fuel cell 12 (the unit cell) by control lines 42 and 44. Practically, the control lines 42 and 44 are connected to current collecting plates (not shown), which are disposed adjacent to the first and second separators 20 and 22, respectively. The current collecting plates are electrically equivalent to the first and second separators 20 and 22, so that the control lines 42 and 44 are connected to the first and second separators 20 and 22 in FIG. 1.

Further, the potentiostat 14 is electrically connected to the potential sweeper 16 by a control line 46. As is well known, the potentiostat 14 is a device for applying a predetermined voltage to the fuel cell 12, and the potential sweeper 16 is a device for controlling the voltage applied by the potentiostat 14. Thus, for example, the activation apparatus 10 is capable of changing the voltage to be applied to the fuel cell 12 between a given value and another given value at a predetermined change rate. In other words, the activation apparatus 10 is capable of controlling the voltage in the same manner as potential sweeping in a cyclic voltammetry, thereby changing the applied voltage with time and repeating the temporal change.

The structures of the potentiostat 14 and the potential sweeper 16 and the temporal voltage change (the potential sweeping) are known in the field of cyclic voltammetry, and therefore detailed explanations thereof are herein omitted.

A method according to this embodiment for activating the fuel cell 12 will be described below.

In this embodiment, the fuel cell 12 is subjected to an activation treatment immediately after its production. Therefore, at first, the assembled fuel cell 12 is electrically connected to the activation apparatus 10.

A humidified hydrogen is supplied to the anode 26, while a humidified nitrogen is supplied to the cathode 28. Of course, the hydrogen and the nitrogen pass respectively through the fuel gas flow field 38 on the first separator 20 and the oxygen-containing gas flow field 40 on the second separator 22.

Then, with respect to the fuel cell 12, a potential is swept (hereinafter referred to as "a voltage is applied") under the control of the potentiostat 14 and the potential sweeper 16 as in the cyclic voltammetry. In this case, the anode 26 is used as a reference, and the potential difference between the anode 26 and the cathode 28 is considered as the sweep potential.

Air (oxygen) is introduced into the fuel cell 12 in the assembling process and remains in the vicinity of the electrode catalyst layer 36 of the cathode 28. Until the air is replaced by the nitrogen supplied to the cathode 28 and removed, the oxygen and the hydrogen react with each other to generate an oxidation-reduction potential. Therefore, it is preferred that application of the voltage to the fuel cell 12 is started after the hydrogen and the nitrogen are supplied to the anode 26 and the cathode 28 respectively and then the potential of the cathode 28 becomes approximately constant at about 0.1 V.

Next, the sweep potential is raised and dropped under the control of the potential sweeper 16. For example, the sweep potential may be within a range of 0.1 to 1.0 V. The raise and drop of the sweep potential is performed in one cycle, and a cyclic voltammogram is obtained in each cycle.

In the raise and drop of the sweep potential, the sweep potential change rate is preferably lower than 50 mV/sec, and more preferably 5 to 20 mV/sec. If the change rate is excessively high, a reaction for removing the oxygen adsorbed to the catalyst (such as Pt) cannot be readily caused. On the other hand, when the change rate is excessively low, it takes a long time to repeat the cycle to be described later, so that the activation requires a long time.

The potential sweeping is performed in the above manner, whereby the activation proceeds.

In this embodiment, the activation is judged to be completed when a redox peak is changed into a predetermined state, not based on the elapsed time of the potential sweeping. Specifically, the following three judgment procedures can be used in this embodiment.

The first judgment procedure will be described below.

FIGS. 2 to 7 are cyclic voltammograms obtained with every 0.5 hours at a sweep potential change rate of 5 mV/sec. The term "0 Hr" in FIG. 2 corresponds to the first cycle.

Figure 8:
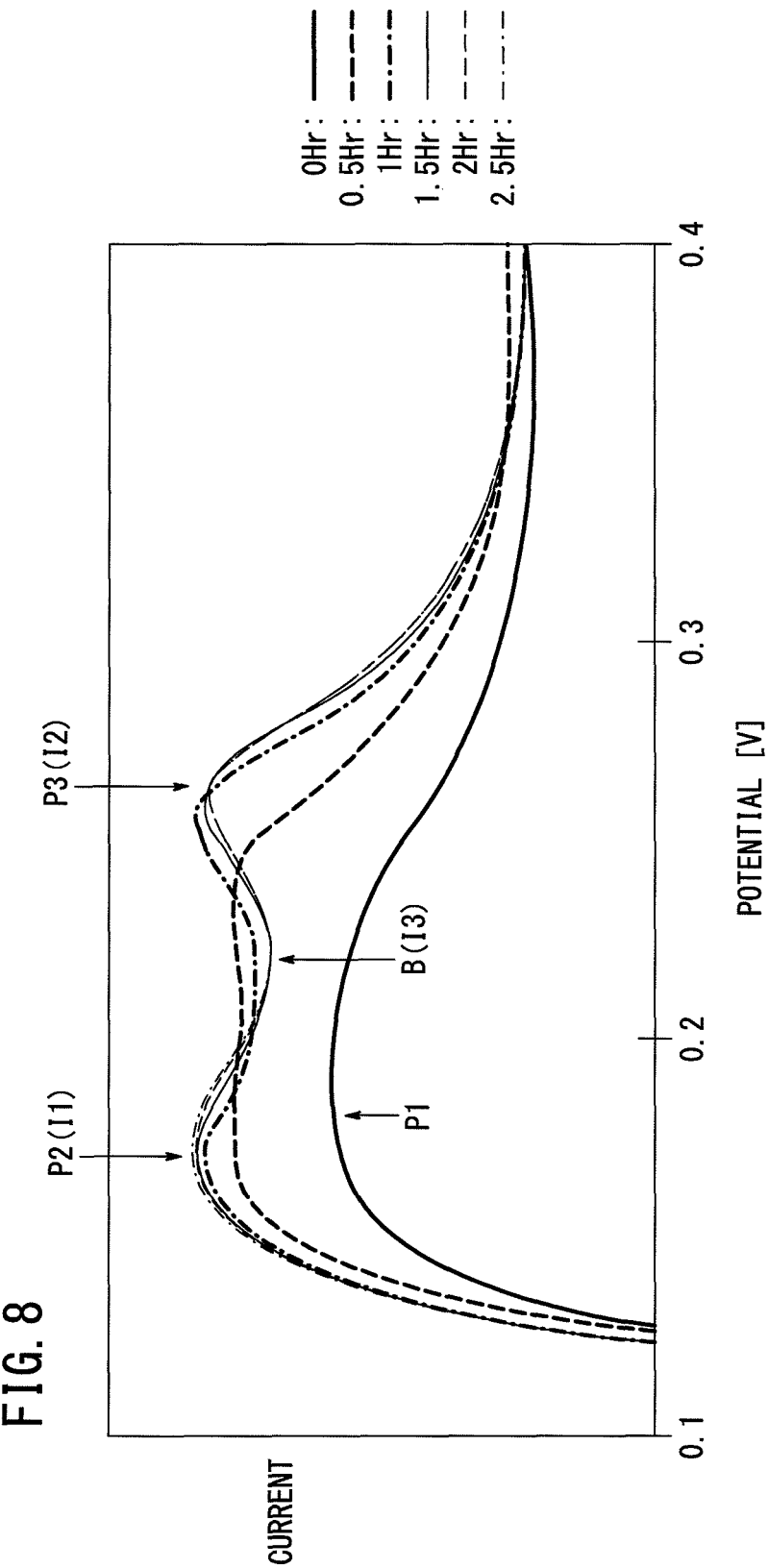
FIG. 8 is an enlarged cyclic voltammogram of FIGS. 2 to 7 showing oxidation regions between 0.1 to 0.4 V.

The ranges of 0.1 to 0.4 V in the cyclic voltammograms are enlarged and shown together in FIG. 8. As is clear from FIG. 8, the number of oxidation peaks within the range of 0.1 to 0.3 V is one when 0 hours have elapsed (in the first cycle) after the start of the potential sweeping, and then the number of oxidation peaks increases to two as the sweeping time passes. In FIG. 8, P1 represents the one oxidation peak observed in the first cycle, and P2 and P3 represent the two oxidation peaks, which appear as the sweeping time passes. Apparently, portions on both sides of the oxidation peak P1 are raised as the sweeping time passes, so that the oxidation peaks P2 and P3 appear.

Figure 7:
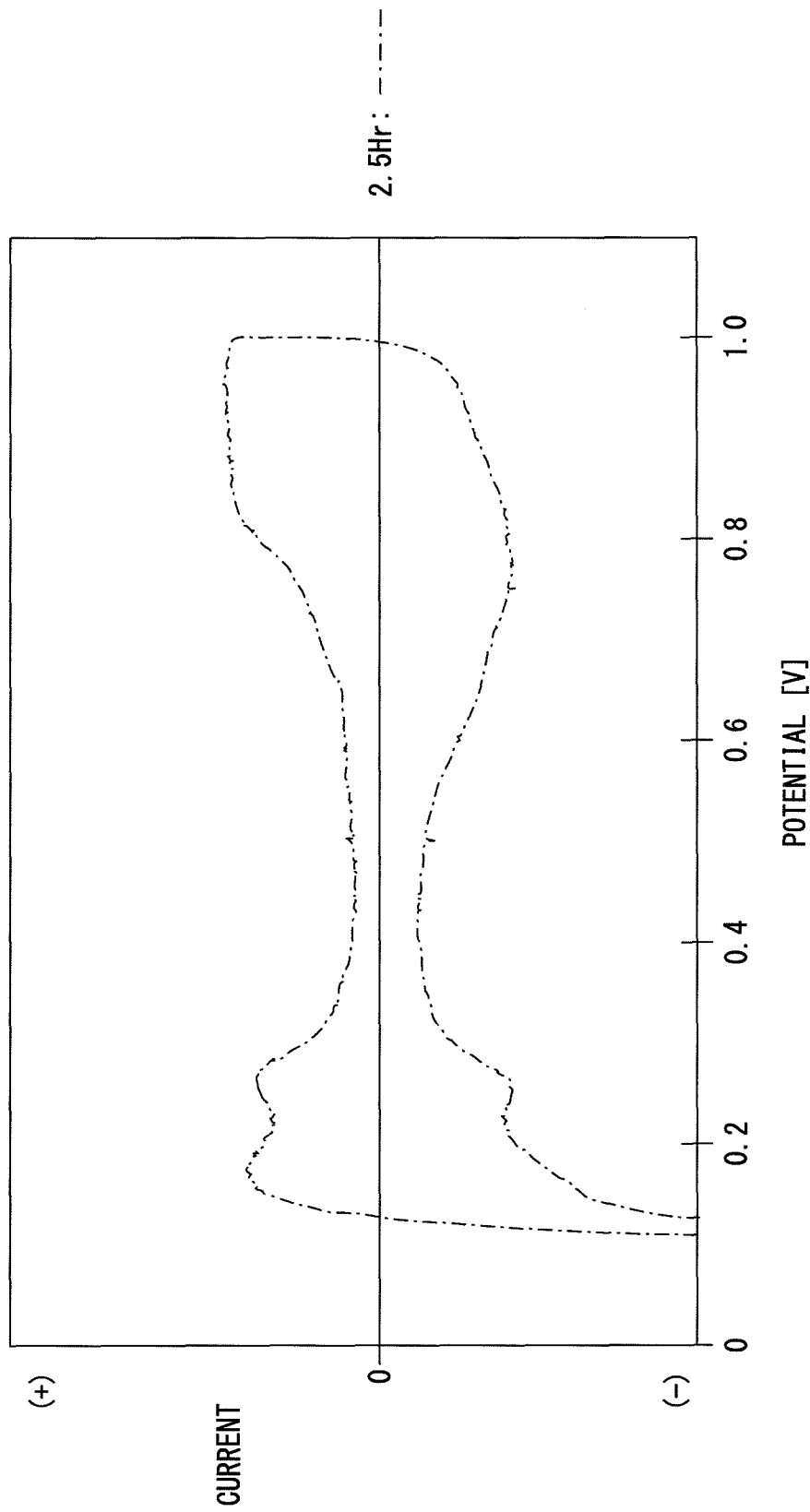
FIG. 7 is a cyclic voltammogram obtained when 2.5 hours (150 minutes) have elapsed after the start of potential sweeping.

As is clear from FIG. 7, as the longer sweeping time passes, the current values of the oxidation peaks P2 and P3 are increased, and the current value of the local minimum (valley) B (at which the current is minimized) between the oxidation peaks P2 and P3 is reduced.

Referring to "Science", Vol. 315 (2007), Page 493 to 497, it is considered that the oxidation peak P1 corresponds to a (111) surface of the Pt in the electrode catalyst layers 32 and 36 (see FIG. 1), and the oxidation peak P2 (around 0.15 to 0.2 V) and the oxidation peak P3 (around 0.25 to 0.3 V) correspond respectively to a (110) surface and a (100) surface of the Pt. Therefore, it is considered that initially the (111) surface of the Pt is mainly exposed, and as the sweeping cycle is repeated, the Pt atom is partially melted and redeposited, whereby the (110) and (100) surfaces become mainly exposed.

The (110) and (100) surfaces of the Pt have catalytic activities higher than that of the (111) surface (see, e.g. Japanese Laid-Open Patent Publication Nos. 2003-157857 and 2010-092799). Thus, by repeating the sweeping cycle, the (110) and (100) surfaces having the higher catalytic activities can be exposed.

I1, I2, and I3 represent the current values of the oxidation peaks P2, P3, and the local minimum B, respectively. As is clear from FIG. 8, even when the sweeping time is lengthened, the current values I1, I2, and I3 saturate at approximately constant values. Therefore, it is difficult to further improve the catalytic activity of the Pt by exposing the (110) and (100) surfaces.

In this embodiment, the activation treatment is judged to be completed when both of the following inequalities (1) and (2) are satisfied.

$$I1/I3 \geq 1.2 \tag{1}$$

$$I2/I3 \geq 1.2 \tag{2}$$

Figure 9:
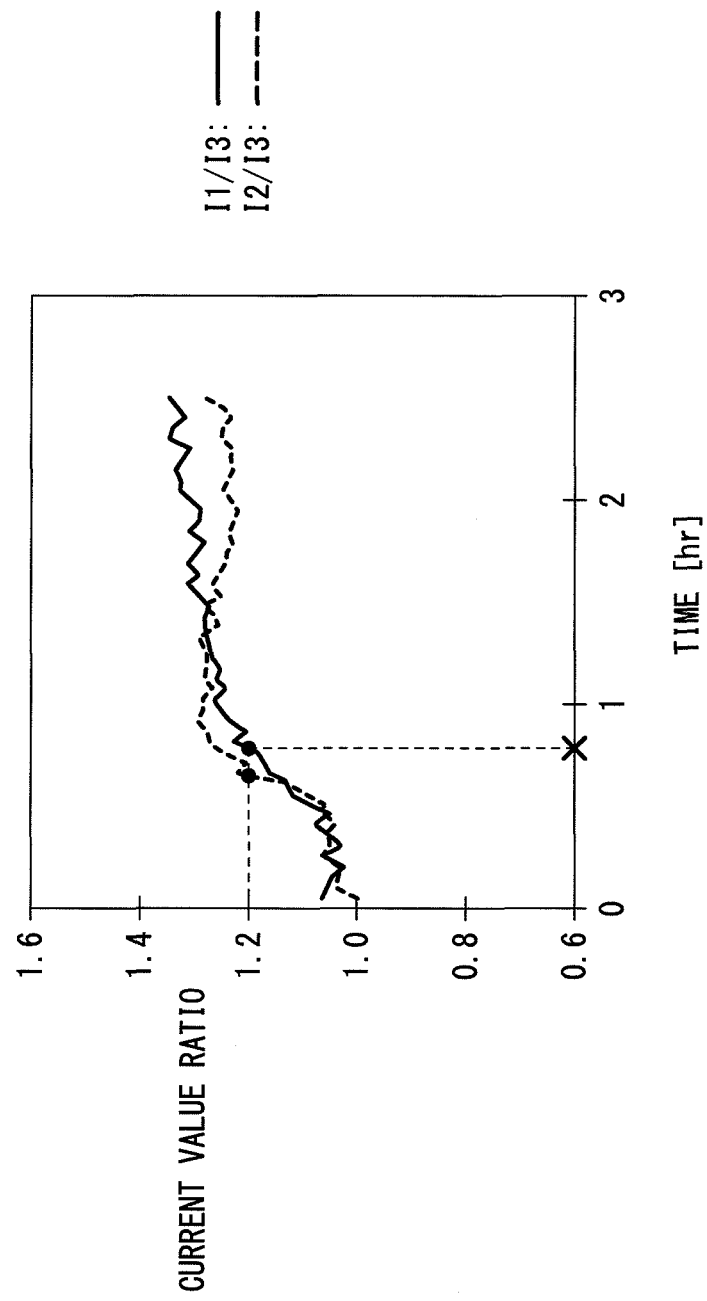
FIG. 9 is a graph illustrating changes of I1/I3 and I2/I3 with time, wherein I1, I2, and I3 represent a current value of peak P2, a current value of peak P3, and a current value of a local minimum B shown in FIG. 8, respectively.

FIG. 9 is a graph for illustrating the changes of I1/I3 and I2/I3 with time. As shown in FIG. 9, both the ratios of I1/I3 and I2/I3 reach 1.2 or more before 1 hour elapses. At this timing, the activation treatment is judged to be completed.

Next, the second judgment procedure will be described below. In the second judgment procedure, the completion of the activation treatment is judged based on the change of a peak within a sweep potential range different from the above range used in the first judgment procedure.

Figure 10:
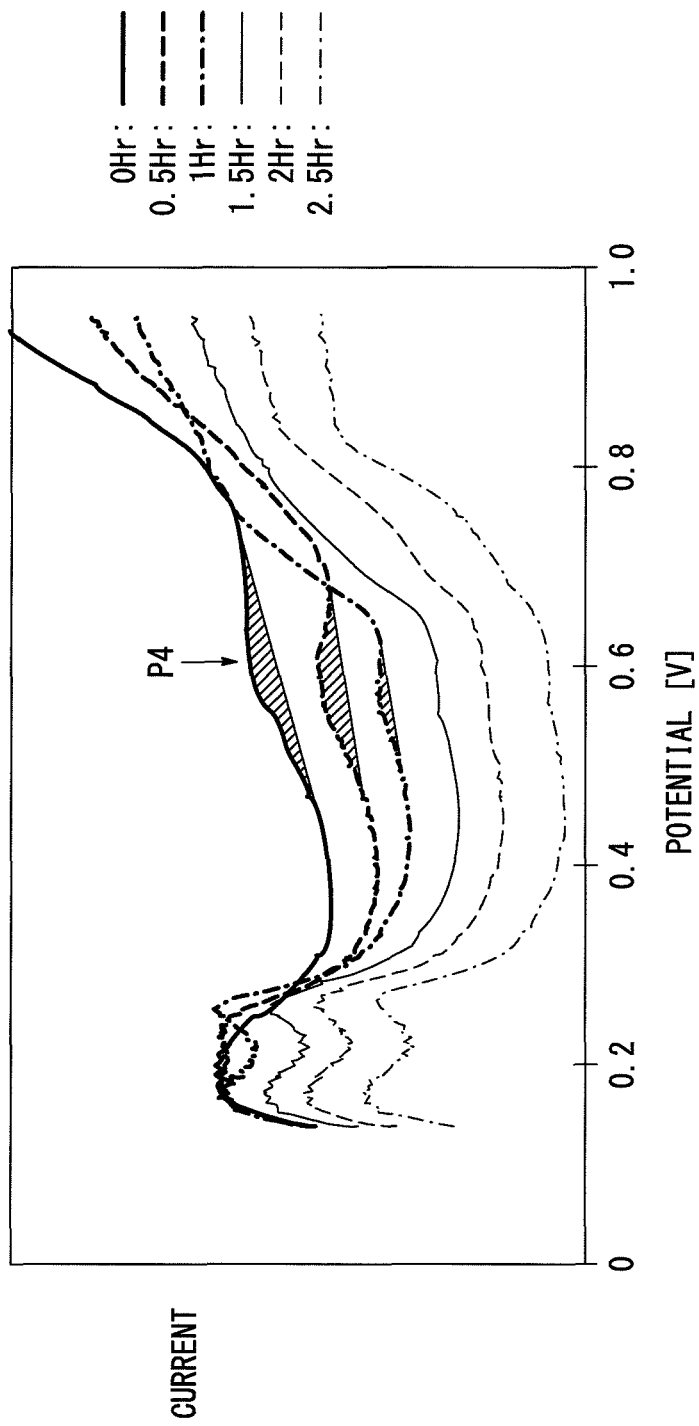
FIG. 10 is a cyclic voltammogram showing enlarged principal oxidation side regions within the range of 0.4 to 0.7 V in the cyclic voltammograms of FIGS. 2 to 7.

FIG. 10 shows a cyclic voltammogram in which the ranges of 0.4 to 0.7 V in the cyclic voltammograms of FIGS. 2 to 7 are enlarged and shown together. As is clear from FIG. 10, as the sweeping time passes, an oxidation peak P4 is lowered (the current value is reduced in the minus direction) in the range of 0.4 to 0.7 V.

The oxidation peak P4 appears in a case where a functional carbon group is bonded to the Pt. That is, as the oxidation peak P4 is larger, a larger number of the carbon functional groups are bonded to the surface of the Pt. In this case, the exposed surface area of the Pt is reduced thereby to lower the catalytic activity.

As shown on the curve of 0 hours (the first cycle), the oxidation peak P4 extends over a range of approximately 0.5 to 0.7 V, and protrudes toward the plus current value. The area of the oxidation peak P4 can be used to determine a charge amount. More specifically, a straight line L1 is drawn between 0.5 V and 0.7 V to form a region surrounded by the straight line L1 and the curve of the oxidation peak P4, and the area of the region (represented by hatching in FIG. 10) is determined.

As is clear from FIG. 10, as the sweeping time passes, the current value of the oxidation peak P4 is reduced, so that the area of the region represented by the hatching is reduced accordingly. Thus, the charge amount is reduced. This means that the carbon functional groups are eliminated from the Pt thereby to increase the exposed surface area of the Pt. Consequently, the active surface of the Pt is further exposed to increase the catalytic activity.

Figure 11:
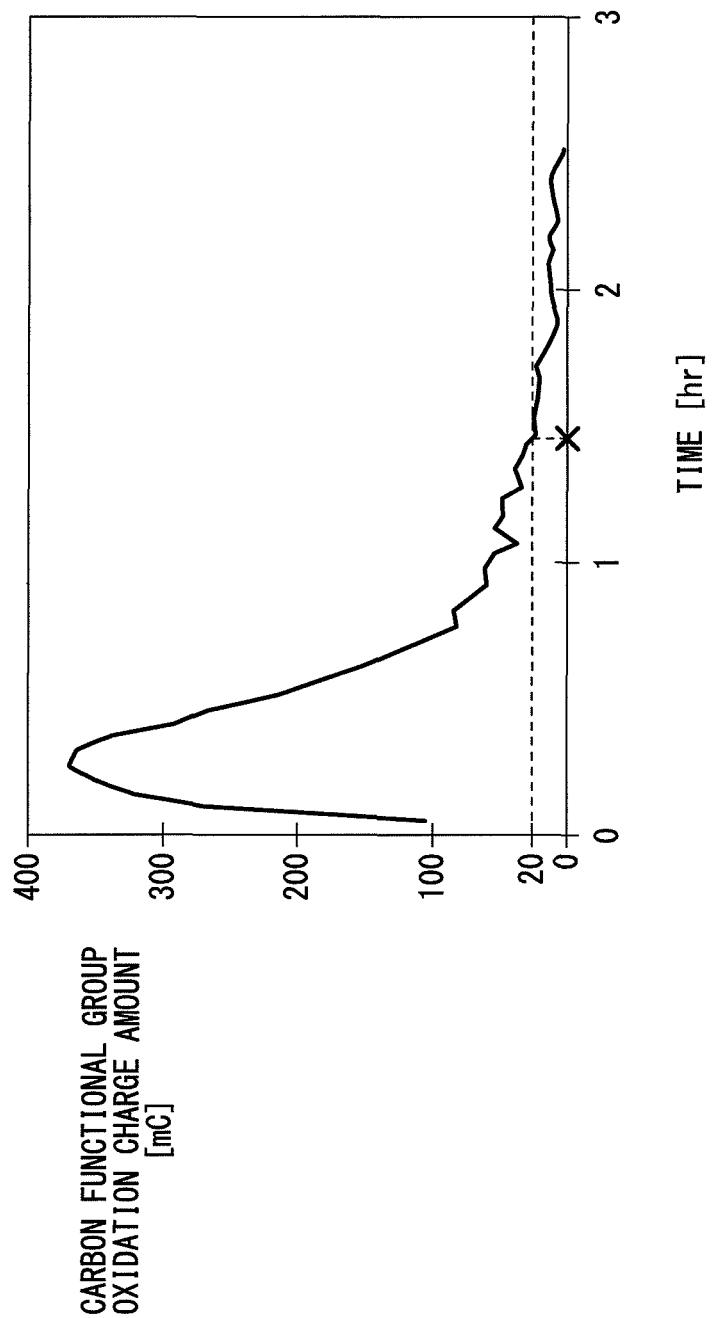
FIG. 11 is a graph for illustrating change of charge amount determined based on an oxidation peak P4 shown in FIG. 10 with time.

As shown in FIG. 11, the area (i.e. the charge amount) of the oxidation peak P4 is drastically reduced about 45 minutes after the start of the potential sweeping, and then is slightly reduced. Therefore, even if the potential sweeping cycle is excessively repeated, it is difficult to further improve the catalytic activity of the Pt by eliminating the carbon functional groups from the Pt.

In this case, the activation treatment is judged to be completed when the charge amount is reduced to 20 mC or less. In the example of FIG. 11, the charge amount becomes 20 mC or less when about 1.5 hours have elapsed after the start of potential sweeping. At this timing, the activation treatment is judged to be completed.

In this embodiment, the activation completion judgment timing in the second judgment procedure is later than that in the first judgment procedure. Therefore, the first and second judgment procedures may be used in combination. Thus, a first phase of the activation is judged to be completed by the first judgment procedure, and the potential sweeping cycle is continued even after that. Then, a second phase of the activation is judged to be completed by the second judgment procedure.

In this case, the highly active (110) and (100) surfaces of the Pt are exposed, and the carbon functional groups are eliminated to increase the active surface area of the Pt. Therefore, the Pt can be further activated as compared with a case where the activation is stopped based on only the first judgment procedure.

Next, the third judgment procedure will be described below. In the third judgment procedure, the completion of the activation treatment is judged based on the change of a peak within a sweep potential range different from the above ranges used in the first and second judgment procedures.

Figure 12:
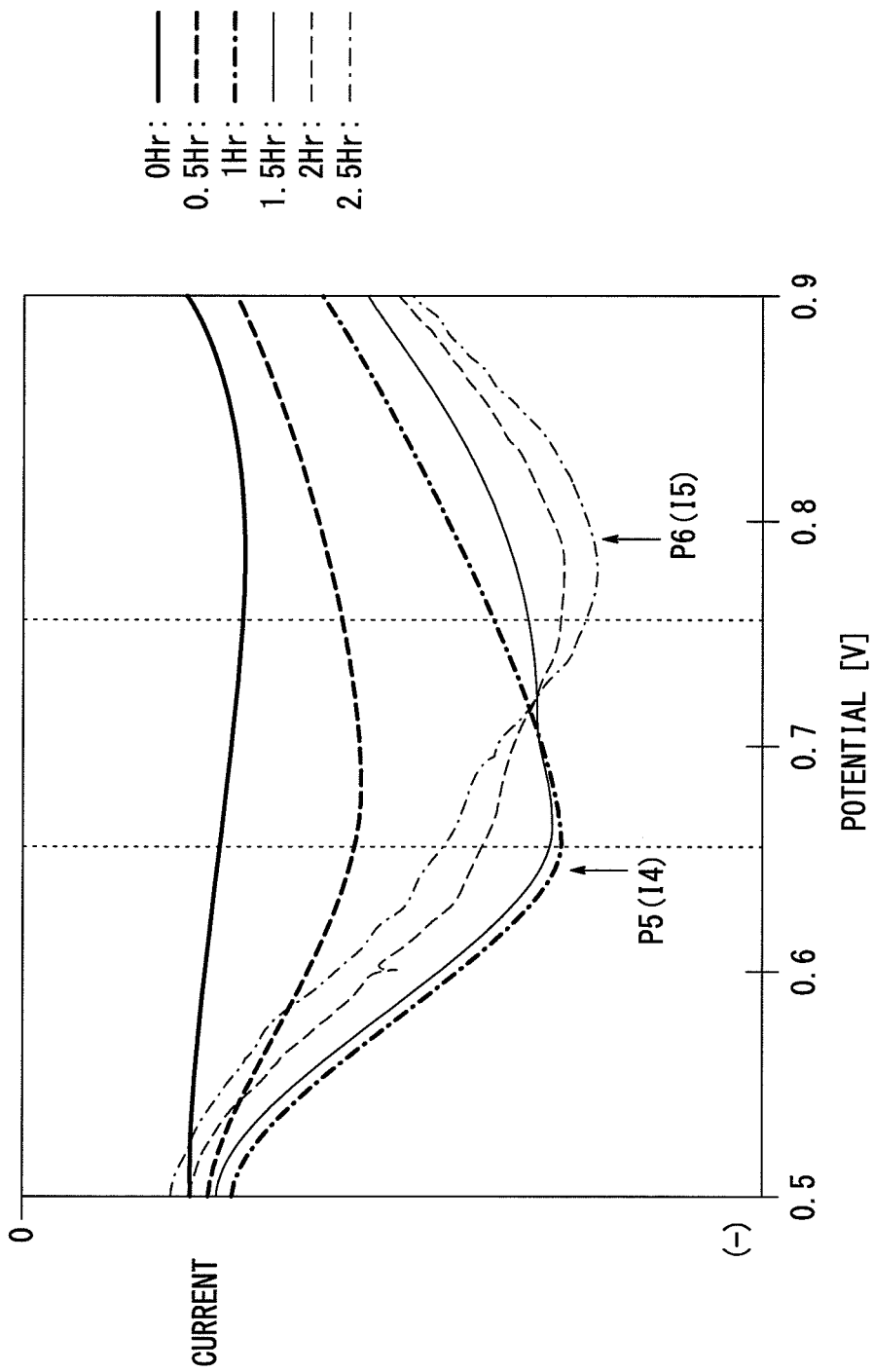
FIG. 12 is an enlarged cyclic voltammogram of FIGS. 2 to 7 showing reduction regions between 0.5 to 0.9 V.

The ranges of 0.5 to 0.9 V in the cyclic voltammograms of FIGS. 2 to 7 are enlarged and shown together in FIG. 12. As is clear from FIG. 12, no peak appears at 0 hours (the first cycle) in the sweep potential range. As the sweeping time passes, firstly a reduction peak P5 appears around 0.6 through 0.7 V and then is shifted to around 0.7 through 0.8 V. For convenience, the shifted reduction peak is referred to as the reduction peak P6, and is distinguished from the reduction peak P5 observed before the shift.

It is considered that the reduction peak P5 is formed in response to the elimination of the oxygen from the Pt. As the elimination reaction proceeds, the reduction peak P5 moves toward the minus direction (the current value is reduced to the minus side). For this reason, the reduction peak P5 moves in the minus direction until 1.5 hours have elapsed after the start of potential sweeping.

It is considered that as the sweeping time further passes, the oxygen elimination reaction is completed, and the eliminated oxygen is bonded to hydrogen ion in a reduction reaction to produce water or hydrogen peroxide. For this reason, the reduction peak P5 is shifted, and the reduction peak P6 appears.

By this, Pt can be judged to be activated enough to reduce all the adsorbed oxygen to water or hydrogen peroxide. The Pt activated in this manner is suitable particularly for the cathode 28 (see FIG. 1), on which an electrode reaction occurs for generating water from oxygen and proton.

Figure 13:
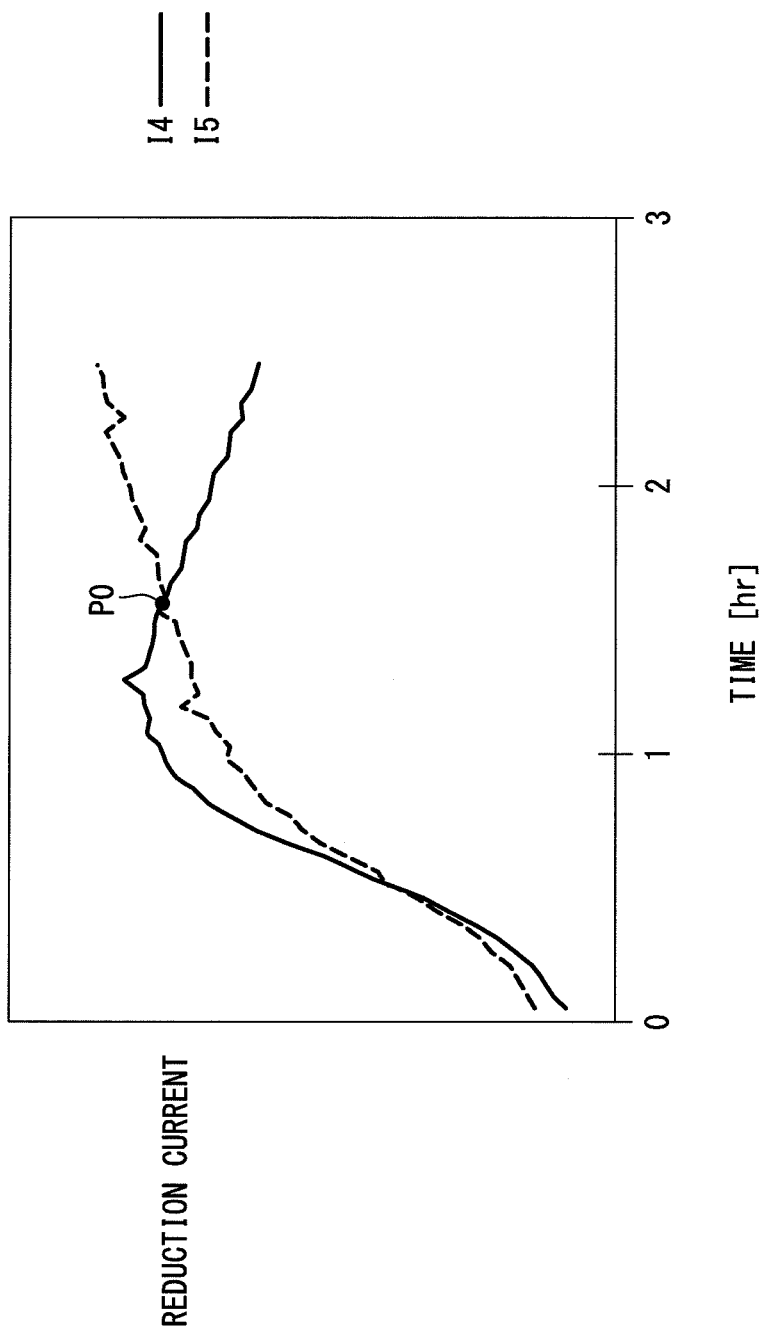
FIG. 13 is a graph illustrating changes of current values I4 and I5 of reduction peaks P5 and P6 shown in FIG. 12 with time.

I4 and I5 represent the current values of the reduction peaks P5 and P6, respectively. As shown in FIG. 13, as the potential sweeping time passes, the current value I4 is increased toward the reduction (minus) side, and then reduced toward the oxidation (plus) side. Meanwhile, the current value I5 continues to increase toward the minus side. Therefore, the curve of the current value I4 decreasing toward the plus side and the curve of the current value I5 increasing toward the minus side intersect with each other at a point PO. Thus, the ratio of I5 to I4 (I5/I4) becomes 1 or more in the range above the point PO.

Figure 14:
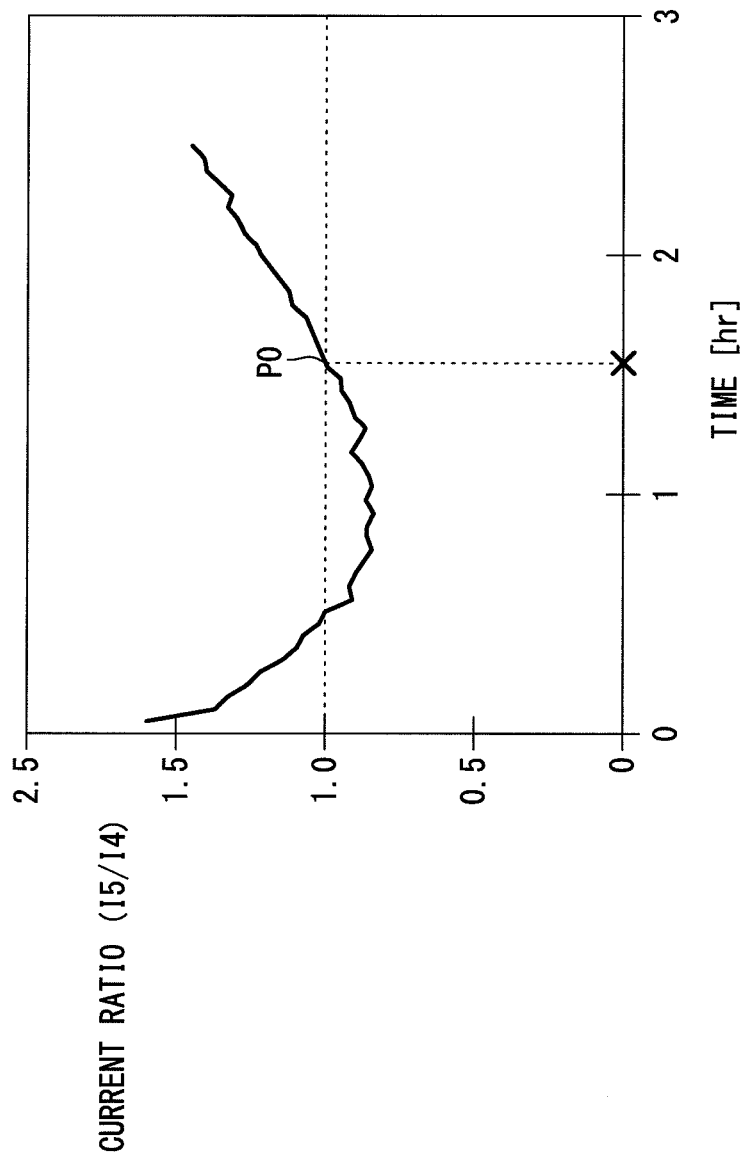
FIG. 14 is a graph illustrating change of a current ratio of I5/I4 with time.

FIG. 14 is a graph for illustrating the change of the ratio I5/I4 with time. The decrease in the ratio I5/I4 in the initial region is mainly due to the elimination of the oxygen from the Pt. Thereafter, the reduction reaction of the eliminated oxygen starts having a dominant influence, and this causes the ratio I5/I4 to increase from less than 1 in the next region. Then, when the ratio I5/I4 reaches 1 (I5/I4=1), i.e. at the point PO shown in FIGS. 13 and 14, it can be judged that the elimination of the oxygen from the Pt and the reduction of the eliminated oxygen have sufficiently proceeded. Thus, the activation treatment is judged to be completed when the ratio I5/I4 increases from less than 1 and then reaches 1.

In the example of FIGS. 12 to 14, the ratio I5/I4 increases from less than 1 and then reaches 1 when about 1.6 hours have elapsed after the start of potential sweeping. At this timing, the activation treatment is judged to be completed.

In a case where the activation of the fuel cell 12 is judged to be completed based on a predetermined elapsed time, when a plurality of the fuel cells 12 are activated, for example, some fuel cells 12 may be sufficiently activated while the other fuel cells 12 may be insufficiently activated because of piece-to-piece variations among the fuel cells 12. Such variations in activity cause variations in power generation performance of the fuel cells 12.

In contrast, in the present embodiment, the activation is judged to be completed when predetermined conditions are satisfied in the first, second, and third judgment procedures. Therefore, regardless of individual differences among the fuel cells 12, the fuel cells 12 can be sufficiently activated approximately equally. Thus, the variations in the activation degrees and the power generation properties can be prevented among a plurality of the fuel cells 12. Furthermore, the resultant fuel cells 12 can exhibit excellent power generation performance.

The activation completion judgment timing in the third judgment procedure is later than those in the first and second judgment procedures. Therefore, all the first to third judgment procedures may be used in combination. Thus, a first phase of the activation is judged to be completed by the first judgment procedure, and even after that, the potential sweeping cycle is continued. Thereafter, a second phase of the activation is judged to be completed by the second judgment procedure. Further, even after that, the potential sweeping cycle is continued, and then a third phase of the activation is judged to be completed by the third judgment procedure.

In this case, the highly active (110) and (100) surfaces of the Pt are exposed, and the carbon functional groups are eliminated to increase the active surface area of the Pt. Furthermore, the oxygen adsorbed to the surface of the Pt is reduced. Therefore, the Pt can be further activated as compared with a case where the activation is stopped based on the first or second judgment procedure or on the combination of the first and second judgment procedures.

It is to be understood that the present invention is not limited to the above embodiment, and various changes and modifications may be made therein without departing from the scope of the invention.

For example, the Pt is used as the catalyst in the above embodiment. However, also when another catalyst, for example, such as gold (Au) is used, the completion of the activation treatment can be judged in the same manner.

In addition, though the fuel cell 12 is subjected to the activation treatment immediately after its production in the above embodiment, the present invention is not limited thereto. For example, the activation treatment may be carried out, for example, in a case where operation (power generation) of the fuel cell 12 is restarted after temporary stoppage thereof, and in a case where the activity of the catalyst is lowered due to a long-time operation.

Although a certain preferred embodiment of the present invention has been shown and described in detail, it should be understood that various changes and modifications may be made therein without departing from the scope of the appended claims.

What is claimed is:

1. A method for activating a fuel cell having an electrolyte membrane containing a solid polymer,
the method comprising the step of sweeping a potential of the fuel cell to obtain a cyclic voltammogram representative of a current versus voltage relationship for the fuel cell,
wherein
the potential sweeping is continued until:
a number of oxidation peaks of the cyclic voltammogram within a range of 0.1 to 0.3 V increases from one to two, and the two oxidation peaks satisfy the inequalities of $I1/I3 \geq 1.2$ and $I2/I3 \geq 1.2$ where I1 and I2 are current values of the two oxidation peaks, respectively, and I3 is the minimum current value between the two oxidation peaks, wherein I3 is a local minimum of the cyclic voltammogram and the minimum current value is a current value smallest among current values existing in a region between the two oxidation peaks along a horizontal axis representing the voltage;
thereafter, an oxidation peak within a range of 0.4 to 0.7 V decreases, and accordingly a charge amount corresponding to the oxidation peak decreases to 20 mC or less, the oxidation peak within the range of 0.4 to 0.7 V having a start point and an end point on the cyclic voltammogram, the charge amount defined by an area bounded by a curve of the oxidation peak and a line connecting the start point of the oxidation peak and the end point of the oxidation peak; and
thereafter, a ratio of I5/I4 increases from less than 1 to 1 where I4 is a current value of a reduction peak within a range of 0.6 to 0.7 V, and I5 is a current value of a reduction peak within a range of 0.7 to 0.8 V,
wherein a first oxidation peak within a range of 0.15 to 0.2 V and a second oxidation peak within a range of 0.25 to 0.3 V are selected as the two oxidation peaks.

2. A method for activating a fuel cell having an electrolyte membrane containing a solid polymer,
the method comprising the step of sweeping a potential of the fuel cell to obtain a cyclic voltammogram representative of a current versus voltage relationship for the fuel cell,
wherein
the potential sweeping is continued until:
a number of oxidation peaks of the cyclic voltammogram within a range of 0.1 to 0.3 V increases from one to two, and the two oxidation peaks satisfy the inequalities of $I1/I3 \geq 1.2$ and $I2/I3 \geq 1.2$ where I1 and I2 are current values of the two oxidation peaks, respectively, and I3 is the minimum current value between the two oxidation peaks, wherein I3 is a local minimum of the cyclic voltammogram and the minimum current value is a current value smallest among current values existing in a region between the two oxidation peaks along a horizontal axis representing the voltage; and
thereafter, an oxidation peak within a range of 0.4 to 0.7 V decreases, and accordingly a charge amount corresponding to the oxidation peak decreases to 20 mC or less, the oxidation peak within the range of 0.4 to 0.7 V having a start point and an end point on the cyclic voltammogram, the charge amount defined by an area bounded by a curve of the oxidation peak and a line connecting the start point of the oxidation peak and the end point of the oxidation peak, wherein a first oxidation peak within a range of 0.15 to 0.2 V and a second oxidation peak within a range of 0.25 to 0.3 V are selected as the two oxidation peaks.

* * * * *